US011609305B2

(12) United States Patent
Dvorecki et al.

(10) Patent No.: US 11,609,305 B2
(45) Date of Patent: Mar. 21, 2023

(54) ONLINE RADAR PHASE CALIBRATION THROUGH STATIC ENVIRONMENT MEASUREMENTS

(71) Applicant: Intel Corporation, Santa Clara, CA (US)

(72) Inventors: Nir Dvorecki, Herzliya (IL); Leor Banin, Petach Tikva (IL); Yuval Amizur, Kfar-Saba (IL); Yaniv Frishman, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 16/729,276

(22) Filed: Dec. 27, 2019

(65) Prior Publication Data

US 2020/0132812 A1 Apr. 30, 2020

(51) Int. Cl.
*G01S 7/40* (2006.01)
*G01S 13/50* (2006.01)
*G01S 13/00* (2006.01)

(52) U.S. Cl.
CPC .......... *G01S 7/4026* (2013.01); *G01S 7/4008* (2013.01); *G01S 13/003* (2013.01); *G01S 13/505* (2013.01)

(58) Field of Classification Search
CPC .... G01S 7/4026; G01S 7/4008; G01S 13/003; G01S 13/505
See application file for complete search history.

(56) References Cited

U.S. PATENT DOCUMENTS

| 2010/0109938 | A1* | 5/2010 | Oswald | G01S 13/522 707/E17.014 |
| 2017/0227623 | A1* | 8/2017 | Park | H04L 7/0016 |
| 2018/0172813 | A1* | 6/2018 | Rao | G01S 7/415 |
| 2020/0158861 | A1* | 5/2020 | Cattle | G01S 7/032 |
| 2020/0300965 | A1* | 9/2020 | Wu | G01S 7/2883 |
| 2021/0026003 | A1* | 1/2021 | Panzer | G01S 7/415 |
| 2021/0063560 | A1* | 3/2021 | Bosse | G01S 13/93 |
| 2021/0072350 | A1* | 3/2021 | Loesch | G01S 13/931 |

* cited by examiner

*Primary Examiner* — Peter M Bythrow
*Assistant Examiner* — Nazra Nur Waheed
(74) *Attorney, Agent, or Firm* — Alliance IP, LLC

(57) ABSTRACT

An apparatus comprising an antenna array comprising a plurality of antennas to receive a plurality of radar signals reflected by a plurality of objects responsive to a transmitted radar signal; a doppler measurement module to determine, for a first reflected radar signal of the plurality of reflected radar signals, a first doppler measurement indicating a velocity component based on a comparison of the first reflected radar signal to the transmitted radar signal; a phase offset measurement module to determine a first phase offset of the first reflected radar signal received at a first antenna of the plurality of antennas relative to a phase of the first reflected radar signal received at a reference antenna of the plurality of antennas; and a phase offset calibration module to determine, for the first antenna, a first phase offset calibration error based on the first doppler measurement and the first phase offset.

20 Claims, 10 Drawing Sheets

ONLINE RADAR PHASE CALIBRATION THROUGH STATIC ENVIRONMENT MEASUREMENTS

TECHNICAL FIELD

This disclosure relates in general to the field of sensing systems and, more particularly, to online radar phase calibration through static environment measurements.

BACKGROUND

A radar system may comprise a transmission system that transmits electromagnetic waves (e.g., radio waves) via one or more antennas and a detection system comprising an array of antennas (that may or may not be the same antennas used to transmit the electromagnetic waves) that detect waves reflected off of various objects in the environment being sensed.

BRIEF DESCRIPTION OF THE DRAWINGS

Like reference numbers and designations in the various drawings indicate like elements.

DESCRIPTION OF EXAMPLE EMBODIMENTS

Figure 1:
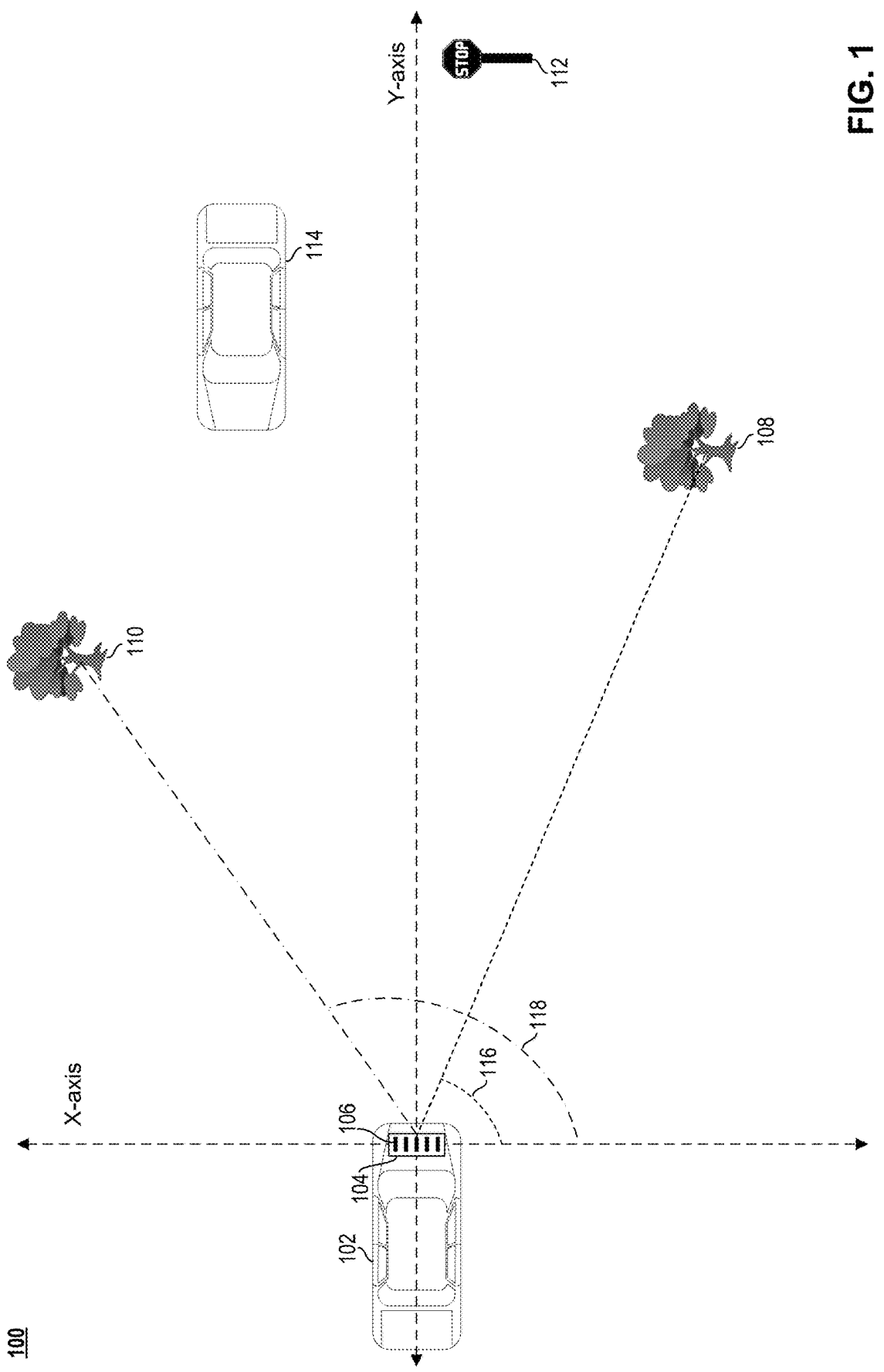
FIG. 1 illustrates an environment comprising a vehicle including a radar system in accordance with certain embodiments.

FIG. 1 illustrates an environment 100 comprising a vehicle 102 including a radar system 104 in accordance with certain embodiments. The radar system 104 may assist in vehicular operations by determining the angles of separation between the radar system 104 and various target objects (e.g., 108, 110, 112, 114) within the environment 100 of the vehicle 102.

The environment 100 may include any number of stationary or moving objects. In the example depicted, environment 100 includes an object 108 (a first tree), an object 110 (a second tree), a stop sign 112, and another vehicle 114. In this example, objects 108, 110, and 112 may be stationary, while object 114 may be moving. An environment may include any number of stationary objects such as portions of a road the vehicle 102 is traveling on, lampposts, streetlights, signs, bushes, trees, buildings, parked vehicles, or other suitable objects. The environment may also include any number of moving objects, such as other vehicles, pedestrians, bicyclists, motorcyclists, or other moving objects.

As depicted, the antenna array of the radar system 104 may include a row of antennas 106 arranged in a line with equal spacing between the antennas (a "uniform linear array"). In the embodiment depicted, a linear array of five antennas 106 is depicted, although other embodiments may include any number of antennas spaced from each other at any suitable distances. In alternative embodiments, the antennas 106 may be arranged in a row, with unequal spacing between the antennas (e.g., at least one pair of adjacent antennas may be separated by a distance that is different from a distance that separates a different pair of adjacent antennas). In some embodiments, the antenna array may comprise a two-dimensional grid of antennas (e.g., multiple linear arrays), a circular or semicircular arrangement of antennas, or antennas arranged in any other suitable configuration.

The antennas may be directional or omnidirectional antennas, including, for example, dipole antennas, monopole antennas, patch antennas, loop antennas, microstrip antennas or other types of antennas suitable for transmission of radar signals (e.g., in the radio or microwave frequency domain).

In the embodiment depicted, the vehicle 102 includes a front facing antenna array (e.g., an antenna array located at or proximate to the front of a vehicle, where the front designates the normal direction of travel of the vehicle 102). In other embodiments, an antenna array may be placed at one or more of the front of the vehicle, a right side of the vehicle, a left side of the vehicle, the back of the vehicle, or other suitable location of the vehicle.

Each antenna array may have its own reference antenna, where the reference antenna may be any arbitrary antenna of the array and wherein certain measurements performed by the antennas may be determined with respect to a similar measurement by the reference antenna (as will be described in more detail below).

In operation, the radar system 104 may transmit a radar signal (e.g., an electromagnetic wave in the radio or microwave spectrum) and antennas 106 of the radar system 104 may each detect the radar signal reflected by a target object in response to the transmitted radar signal. Each one of the antennas will receive a different phase of the reflected signal. The angle of separation between the radar system 104 and the target object may be calculated based on how the phase progresses across the antenna array (e.g., by measuring the phases received at each antenna). In order to precisely determine the angle of separation in this manner, accurate measurement of the phases of the signals received at each antenna is important. Some radar systems designed for use in autonomous vehicles operate in the 76-81 GHz band with large antenna arrays. The small wavelength and numerous antennas employed offers a significant gain in spatial resolution. However, these also make the calibration process between the antenna phases very difficult.

Inaccurate phase measurements may result from a number of factors, such as varying lengths of the antennas 106 in the array, effects due to temperature changes, changes in position of the antennas over time (e.g., a dent in the vehicle could affect the phase measurements), other design factors, or other environmental factors. The phase measurement errors resulting from such factors may make it difficult to determine accurate angular resolutions and/or may create biases in such measurements.

To account for some of these factors, a factory calibration may be performed at or around the time of manufacture of the vehicle 102. An example of such calibration may include utilizing a target (e.g., a corner reflector) and adjusting the position of the target (with each position being known to the calibration system) and observing the phases obtained at each position to determine adjustments that are to be made to phase measurements performed in the future in order to accurately calculate angles of separation. However, a factory calibration cannot account for all potential error sources (e.g., temperature changes, antenna position changes, or changes due to antenna aging). Loop-back calibration approaches are expensive, complex, and typically require the radar system to be disabled during the calibration process. In addition, such calibration techniques cannot fully account for all impairments, such as changing phase offsets caused in the antenna array itself.

One of the key differences between the typical use-case scenarios of autonomous vehicle (AV) radars and airborne radars is the inclusion of the static environment. Stationary objects such as stationary vehicles, signs, lamp posts, and even the road itself may be considered as nuisance measurements that clutter the required targets (e.g. moving vehicles or pedestrians) for detection. A common approach is to filter out the static environment as much as possible before performing the detection of moving target objects.

Various embodiment of the present disclosure may provide online correction of phase offsets between the antennas of the radar system for AV applications. Rather than filtering out the static environment, the static objects within the environment 100 may be leveraged to calibrate the radar while the vehicle 102 is moving. For example, the static objects (e.g., 108, 110, 112) may be used as a measurement source for the phase offsets between the antennas of the array. The doppler measured from a static object is proportional to the sine of an angle θ between an axis perpendicular to the direction of the vehicle 102 and the line of sight to the object, and the phase offset between the antennas is proportional to the cosine of the same angle θ, but is also corrupted by the unknown calibration error. Thus, two different measurement types may be used to determine the angle θ: the direct angle measurement based on the phase offsets between antennas (e.g., the standard radar measurement) or an angle measurement based on the dopplers measured by the antennas. By comparing the doppler measurements with the phase measurements, the phase offset calibration errors for the antennas may be estimated. Usually the angle measurements performed based on the doppler measurements are relatively noisy, and not as accurate as the angle measurement using the phase offsets between antennas. Accordingly, in some embodiments, the dopplers measured across a variety of static objects in the environment 100 by the radar system 104 may be used in the determination of calibration errors of the antennas 106. In general, when the doppler measurements are performed across a wide variety of target objects, the noise may be filtered out, resulting in estimated calibration errors that are more accurate than when doppler measurements for a single target object or a small subset of target objects are performed. In this manner, a calibration error may be determined for each antenna 106 in the array to calibrate angle of separation measurements performed by the radar system 104 based on phase offsets measured across the array of antennas 106.

Various embodiments may provide one or more technical advantages, such as an improvement in the accuracy and reliability of the radar system 104 and the ability to perform calibration without requiring factory calibration, potentially saving time and equipment during manufacturing and installment.

As described above, radar system 104 may measure the doppler of the signal being reflected by target objects in the environment 100. When the radar signal is transmitted and reflects off of a target object, the reflected signal is received back at an antenna 106 at a slightly different frequency, where the change in frequency of the transmitted signal and the received signal is a function of the radio velocity. If the vehicle 102 is driving straight towards the target object, the magnitude of change in frequency is directly correlated with the speed of the vehicle. However, if the vehicle 102 is traveling at an angle to the object, the magnitude of change in frequency will be a function of the angle between the direction the vehicle 102 is traveling and the line of sight vector to the target object.

Figure 2:
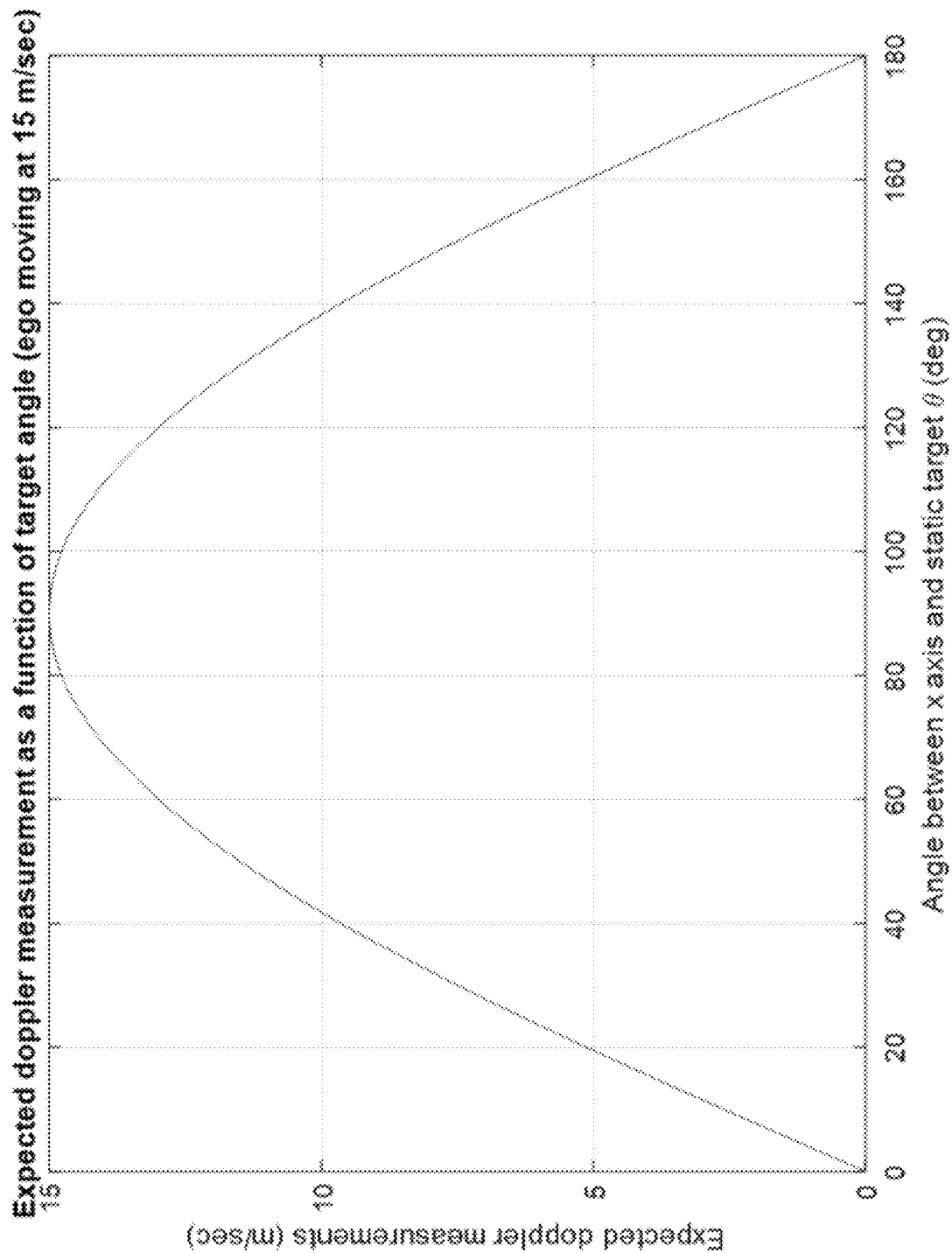
FIG. 2 illustrates expected doppler from stationary targets as a function of the angle of the target in accordance with certain embodiments.

FIG. 2 illustrates a graph depicting expected doppler from stationary target objects as a function of the angle of the target in accordance with certain embodiments. The graph assumes that the is vehicle 102 (also referred to as ego) is traveling at a speed of 15 m/sec along the y-axis. As depicted in FIG. 1, the y-axis is defined as the axis extending through the direction of travel of the vehicle 102. The x-axis is defined as the axis extending perpendicularly to the y-axis at the same elevation as the y-axis, e.g., the x-axis may be the axis to the left and right of the vehicle 102. The angle θ between the radar system 104 and a target object is defined as the angle between the x-axis and the line of sight from the radar system 104 (e.g., at the intersection of the y-axis and the x-axis) to the target object. For example, the angle θ for the object 108 (the first tree) is depicted by angle 116 and the angle for the object 110 (the second tree) is depicted by angle 118.

Referring again to FIG. 2, the magnitude of the expected doppler from a stationary target object is zero for objects that are located on the x-axis (i.e., have a θ of 0 or 180). The expected doppler increases as θ increases from 0 up to a maximum (equal to the velocity of the vehicle 102) at 90 degrees and then decreases as θ increases from 90 degrees to 180 degrees. The value of the expected doppler is $D_{exp}=S_r \sin(\theta_{obj})$, where $D_{exp}$ is the expected doppler, $S_r$ is the true speed of the radar system 104 along the y-axis, and $\theta_{obj}$ is the angle between the x-axis and the line of sight to the target object.

The measured doppler from target i is given by: $D_i=S_r \sin(\theta_i)+n_i$, where $D_i$ is the measured doppler, $S_r$ is the true speed of the radar system 104 along the y-axis, $\theta_i$ is the angle between the line of sight to the stationary target i and the x-axis and $n_i$ is a residual noise term (having a magnitude based on the accuracy of the radar), whose distribution is usually considered to be known. Thus, the measured doppler is the same as the expected doppler plus a noise component.

When measuring the doppler observed at the antennas 106 of the array, the same θ is assumed for all antennas. While the actual θ may be slightly different due to the differing positions of the antennas, the difference in the actual angle is negligible and may be ignored. In some embodiments, the angle θ measured by the radar system 104 may be the angle with respect to any suitable point on the radar system, such as the center of the array of antennas, the reference antenna, or other suitable point. For a certain target object, the measured doppler is assumed to apply to the entire array (i.e., each antenna observes the same doppler). The doppler measurement may indicate a velocity component based on a comparison of the reflected radar signal to the transmitted radar signal. For example, to determine the doppler for a target object, the radar system 104 may measure a change in the transmitted frequency and the reflected frequency and then may convert this change in frequency to a change in velocity (e.g., by multiplying the change in frequency by the propagation speed of waves in the medium (generally air for an AV application) and dividing by the transmitted frequency). The change in velocity may be equal to the radial velocity of the source minus the radial velocity of the receiver (which is zero when the target object is stationary), and thus may be the velocity of the vehicle towards the object.

The speed estimate $S_r$ of the radar along the y-axis may generally be determined by the vehicle 102 to a high degree of accuracy (e.g., within a few cm/s). The vehicle 102 may utilize any suitable sensor or other information to determine the speed. For example, measurements from radar system 104, one or more cameras, laser sensors, inertial measurement units, global positioning systems (GPS), or other measurements may be used by the vehicle 102 to calculate its speed.

When the antenna array includes a linear uniform array along the x-axis, the measured phase difference between antenna number k and the reference antenna (where the reference antenna may be located, e.g., at the intersection of the x and y axis) is calculated as:

$$\delta\phi_{i,k} = \frac{2\pi dk}{\lambda}\cos(\theta_i) + \beta_k,$$

where d is the distance between each pair of adjacent antennas, $\lambda$ is the carrier wavelength, and $\beta_k$ is the calibration phase error between the two antennas. Thus, $$\frac{2\pi dk}{\lambda}\cos(\theta_i)$$

is the expected theoretical phase offset between the reference antenna and antenna under consideration in the uniform linear array, but will not be equal to the actual phase offset unless the calibration phase error is equal to 0.

When the antenna array is a linear uniform array and the reference antenna is at the center of the array, the value of k at the reference antenna is assumed to be 0, the value of k for an antenna adjacent to the reference antenna in a first direction is 1, the value of k for the next antenna in the first direction is 2, and so on. The value of k for the antenna adjacent to the reference antenna in the direction opposite to the first direction is −1, the value of k for the next antenna in the direction opposite to the first direction is −2, and so on. Alternatively, the reference antenna (with k=0) may be chosen as an antenna on the edge of the antenna array, and the value of k may monotonically increase for the antennas in a certain direction (e.g., k=1 for the antenna adjacent to the reference antenna, k=2 for the next antenna, and so on).

When the antenna array is linear but the distances between pairs of antennas is non-uniform, the dk term from the above equation may be replaced by the actual distance between the reference antenna and the particular antenna for which the phase difference is being measured. When the array is not linear (e.g., a circular array), the calculation for the phase difference between a particular antenna and a reference antenna is more complex, but may be calculated by one of ordinary skill in the art.

For a typical AV use case, the expected error in $S_r$ is in the order of a few cm/sec and can therefore be neglected. Thus, the operations used to obtain $\theta$ in the equations recited above for the measured phase difference and the measured doppler may be set equal to each other and the calibration offset error may be isolated and solved for. In various embodiments, because the doppler measurement includes a noise term that may distort the doppler measurement, the doppler measurements may be performed across a plurality of static objects so as to eliminate or at least drastically limit the effect of the noise term $n_i$. In other words, the angle $\theta$ may be estimated using doppler measurements across a plurality of static target objects, and then that estimated $\theta$ may be used to estimate the phase offset calibration error, because if the expected $\theta$ is known, then the expected phase offset is known and can be compared with the measured phase to determine the phase offset calibration error.

In an embodiment in which the antenna array is a uniform linear array, an estimate of the phase offset calibration error for a particular antenna k is given by the plug-in estimate:

$$\hat{\beta}_k = \frac{1}{N}\sum_i \delta\phi_{i,k} - \frac{2\pi dk}{\lambda}\cos\left(\arcsin\left(\frac{D_i}{S_r}\right)\right),$$

where N is the number of target objects measured, $\delta\phi_{i,k}$ is the actual measured phase difference (relative to the reference antenna) at the antenna k for object i, and $D_i$ is the actual measured doppler for object i. If the antenna array is a non-linear array, the dk term may be replaced by the actual distance between the reference antenna and the antenna k. If the antenna array has a different shape, the equation for the phase calibration error may be modified accordingly.

In effect, a radar system 104 determining a phase offset calibration error according to this equation may perform phase offset and doppler measurements across all of the detected objects in the environment for a particular antenna k, compute the phase offset calibration error for each pair of measurements for an object, and then average the computed phase offset calibration errors to determine the phase offset calibration error for a particular antenna. In other embodiments, the phase offset calibration error may be determined based on computed phase offset calibration errors of any number of pairs of measurements for the antenna k. For example, the estimate of the calibration error may utilize a trimmed mean, where one or more outlier calibration errors (e.g., the minimum 10% and the maximum 10%) calculated for particular objects in the environment are discarded, and the remaining calibration errors are averaged together to determine the final phase offset calibration error. As another example, the median of the phase offset calibration errors for the various objects may be selected as the final phase offset calibration error.

In an embodiment, objects that are detected and determined to be moving objects may be filtered out and not considered when calculating the phase offset calibration error according to the above. However, in general, the number of static objects in an environment may be one or more orders of magnitude greater than the number of moving objects. This is generally because the static measurements appear at all possible ranges (e.g., from the ground) while the moving targets are sparse in the range-doppler map. Therefore, even if the phase offset calibration errors calculated from moving objects are included in the set of measurements considered during determination of the final phase offset calibration error, simple robust filters of the phase offset calibration error measurements such as those described above are enough in order to achieve good performance with this method. Since there are many more measurements from static targets, the methods described above can robustly estimate the required phase offset calibration error, even in the presence of other moving objects.

Although the examples above consider operations for a front-facing antenna array, the operations may be adapted for a side-facing or rear-facing antenna array. If the antenna array is not on the front of the vehicle, then the $\theta$ term in the equation above for the measured phase difference may be modified accordingly. For example, if the antenna array is on the right side of the vehicle (e.g., facing toward the positive side of the X-axis), then the $\theta$ term in the measured phase difference equation becomes $\pi/2+\theta$, if the antenna array is facing left the $\theta$ term becomes $\theta-\pi/2$, and if the antenna array is on the back, the $\theta$ term becomes $\pi+\theta$.

Figure 3:
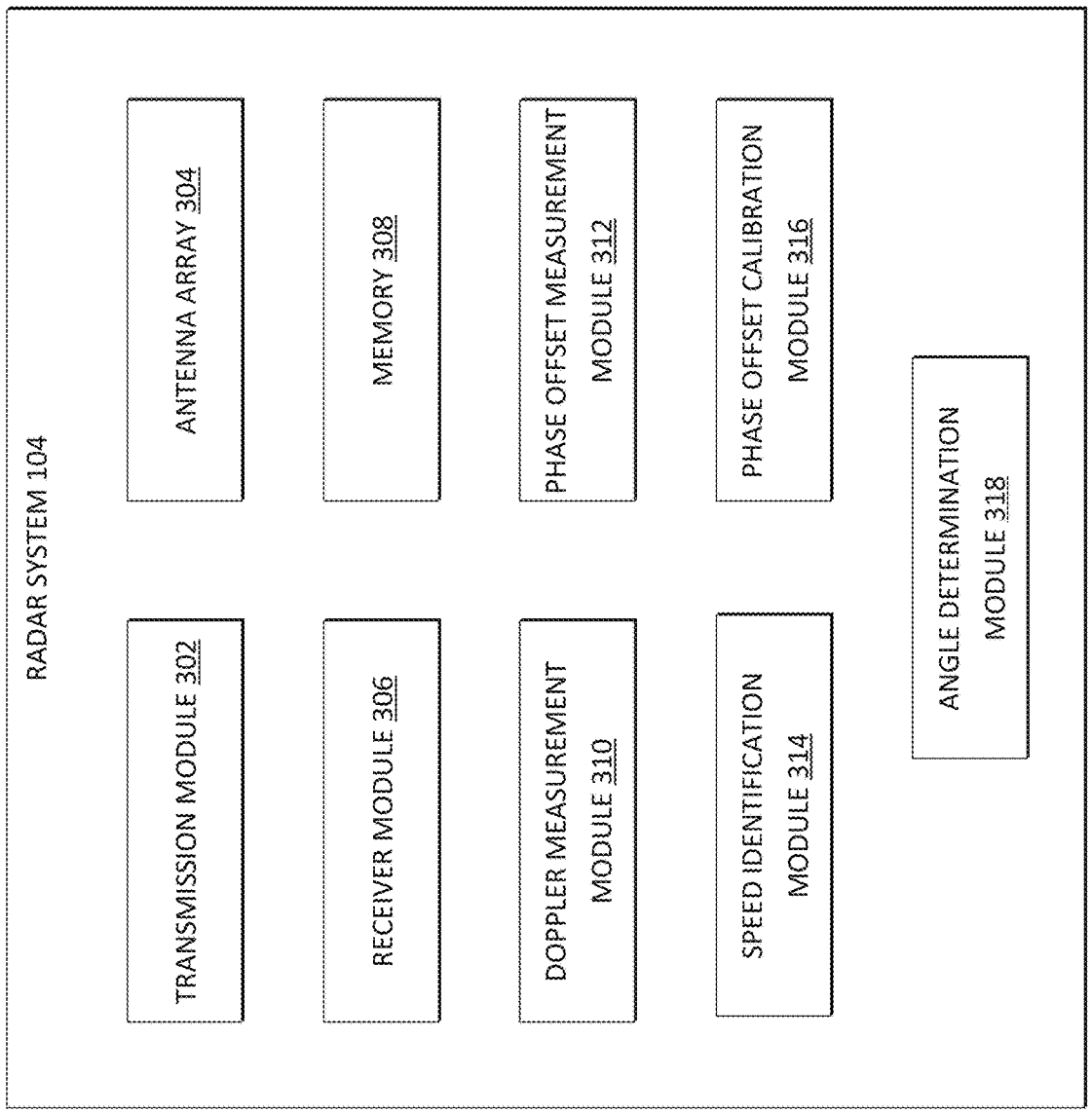
FIG. 3 illustrates a radar system to perform online radar phase calibration in accordance with certain embodiments.

FIG. 3 illustrates a radar system 104 to perform online radar phase calibration in accordance with certain embodiments. Radar system 104 comprises a transmission module 302 to generate and transmit a radar signal across an environment, e.g., of a vehicle, such as an autonomous vehicle. The radar system 104 further comprises an antenna array 304 which may comprise a plurality of antennas (e.g., antennas 106). One or more of these antennas may be used to transmit the radar signal across the environment. Alternatively, one or more different antennas may be used to transmit the radar signal.

Receiver module 306 may comprise circuitry to assist in the reception by the antennas of the antenna array 304 of radar signals reflected by objects of the environment. For example, receiver module 306 may amplify the received signals for further processing. Memory 308 may comprise any suitable volatile or non-volatile memory to store data utilized by any of the modules of the radar system 104, such as intermediate or final results.

Doppler measurement module 310 may determine a doppler measurement for each reflected signal from an object of the environment. Phase offset measurement module 312 may determine, for each reflected signal and for each antenna of the array 304 other than a reference antenna, a phase offset of the reflected signal relative to a phase of the reflected signal received at the reference antenna.

Speed identification module 314 is operable to determine a speed of the vehicle 102. Speed identification module 314 may determine the speed from the received radar signals or may communicate with other sensors or modules of the vehicle to determine the speed of the vehicle.

Phase offset calibration module 316 is operable to determine phase offset calibration errors for the antennas of the antenna array 304 based on the doppler and phase offset measurements. The phase offset calibration errors may also be based on the speed of the vehicle.

Angle determination module 318 is operable to determine angles of the reflected signals (and thus the angles of the associated objects) based on the phase offset measurements and the determined phase offset calibration errors. For example, the phase offset calibration error for a particular antenna may be subtracted from the phase offset measured at the particular antenna for a reflected signal from a particular object to determine a calibrated phase offset. This calibrated phase offset may be considered along with other similar calibrated phase offsets for the other antennas of the array 304 to determine the angle of the object. Similar operations may be repeated for any suitable objects for which measured angles are desired.

Figure 4:
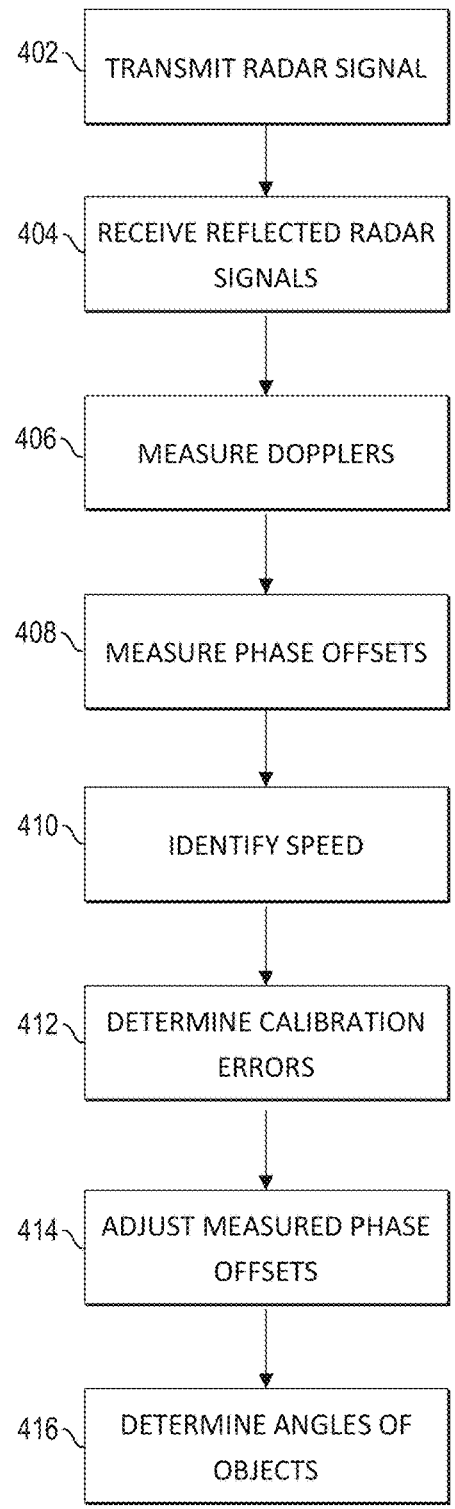
FIG. 4 illustrates a flow for calibrating phase offsets in a radar system in accordance with certain embodiments.

FIG. 4 illustrates a flow 400 for calibrating phase offsets in a radar system in accordance with certain embodiments. Some or all of the operations of the flow may be performed by, e.g., a radar system 104, other suitable logic of an autonomous vehicle, or other suitable logic. At 402, a radar signal is transmitted. At 404, reflected radar signals are received. The radar signals may be reflected by a plurality of objects within a range of the transmitted radar signal.

At 406, doppler measurements are performed on the reflected radar signals. At 408, phase offsets of the reflected radar signals are measured. At 410 a speed of the antenna array (e.g., which may be the same as the speed of a vehicle comprising the antenna array) is determined.

At 412, phase offset calibration errors are determined for the antennas of the array based on the measured dopplers, the measured phase offsets, and the identified speed. At 414, the measured phase offsets may be adjusted according to the determined phase offset calibration errors. At 416, angles of one or more objects is determined based on the adjusted phase offsets.

The flow described in FIG. 4 is merely representative of operations or communications that may occur in some embodiments. In other embodiments, additional operations or communications may be performed in the flow. Various embodiments of the present disclosure contemplate any suitable signaling mechanisms for accomplishing the functions described herein. Some of the operations illustrated in FIG. 4 may be repeated, combined, modified, or deleted where appropriate. Additionally, operations may be performed in any suitable order without departing from the scope of various embodiments.

FIGS. 5-10 illustrate example environments in which various aspects of the present disclosure may operate or various components that may be used to perform operations described herein. For example, any of the modules (e.g., 302, 304, 306, 308, 310, 312, 314, 316, or 318 may be implemented by a processor, such as roadside computing devices (e.g., 540), fog- or cloud-based computing systems (e.g., 550), processor 602, 900, 1070, or 1080, system 610, computing system 1000, or other suitable combination of circuitry (which in some cases may include a computer readable medium with instructions for execution of various operations described herein). As another example, any of the sensors described below may be used to collect the sensor data alluded to herein. As another example, the radar system 104 may be integrated or used in conjunction with any vehicle described herein.

In various embodiments, any one or more operations described herein may be performed in-vehicle or by one or more servers coupled to a vehicle (various processing environments are described in more detail below).

Figure 5:
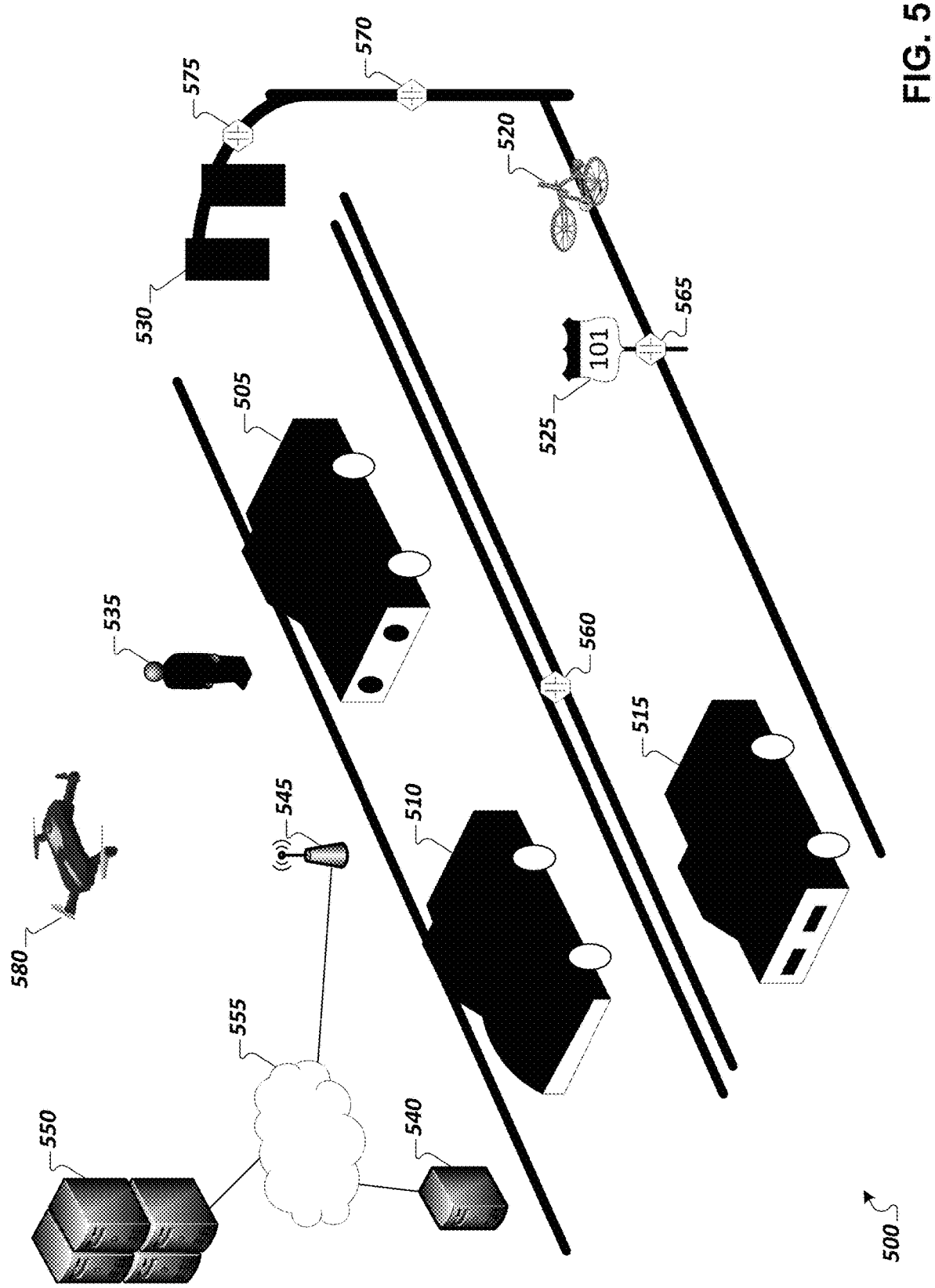
FIG. 5 is a simplified illustration showing an example autonomous driving environment in accordance with certain embodiments.

FIG. 5 is a simplified illustration 500 showing an example autonomous driving environment. Vehicles (e.g., 505, 510, 515, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road users (e.g., pedestrians (e.g., 535), bicyclists, etc.), detect obstacles and hazards (e.g., 520), and road conditions (e.g., traffic, road conditions, weather conditions, etc.), and adjust control and guidance of the vehicle accordingly.

In some implementations, vehicles (e.g., 505, 510, 515) within the environment may be "connected" in that the in-vehicle computing systems include communication modules to support wireless communication using one or more technologies (e.g., Institute of Electrical and Electronics Engineers (IEEE) 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles or supporting infrastructure. For instance, in some implementations, vehicles (e.g., 505, 510, 515) may communicate with computing systems providing sensors, data, and services in support of the vehicles' autonomous driving capabilities. For instance, as shown in the illustrative example of FIG. 5, supporting drones 580 (e.g., ground-based and/or aerial), roadside computing devices (e.g., 540), various external (to the vehicle, or "extraneous") sensor devices (e.g., 560, 565, 570, 575, etc.), and other devices may be provided as autonomous driving infrastructure separate from the computing systems, sensors, and logic implemented on the vehicles (e.g., 505, 510, 515) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 5, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 560, 565, 570, 575) may be provided, which include sensors for observing portions of roadways and vehicles moving within the environment and generating corresponding data describing or embodying the observations of the sensors. As examples, sensor devices may be embedded within the roadway itself (e.g., sensor 560), on roadside or overhead signage (e.g., sensor 565 on sign 525), sensors (e.g., 570, 575) attached to electronic roadside equipment or fixtures (e.g., traffic lights (e.g., 530), electronic road signs, electronic billboards, etc.), dedicated road side units (e.g., 540), among other examples. Sensor devices may also include communication capabilities to communicate their collected sensor data directly to nearby connected vehicles or to fog- or cloud-based computing systems (e.g., 540, 550). Vehicles may obtain sensor data collected by external sensor devices (e.g., 560, 565, 570, 575, 580), or data embodying observations or recommendations generated by other systems (e.g., 540, 550) based on sensor data from these sensor devices (e.g., 560, 565, 570, 575, 580), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road users, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 540, 550), other sensor devices (e.g., 560, 565, 570, 575, 580), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 540, 550). For instance, a connected vehicle may communicate with road-side units, edge systems, or cloud-based devices (e.g., 540) local to a particular segment of roadway, with such devices (e.g., 540) capable of providing data (e.g., sensor data aggregated from local sensors (e.g., 560, 565, 570, 575, 580) or data reported from sensors of other vehicles), performing computations (as a service) on data provided by a vehicle to supplement the capabilities native to the vehicle, and/or push information to passing or approaching vehicles (e.g., based on sensor data collected at the device 540 or from nearby sensor devices, etc.). A connected vehicle (e.g., 505, 510, 515) may also or instead communicate with cloud-based computing systems (e.g., 550), which may provide similar memory, sensing, and computational resources to enhance those available at the vehicle. For instance, a cloud-based system (e.g., 550) may collect sensor data from a variety of devices in one or more locations and utilize this data to build and/or train machine-learning models which may be used at the cloud-based system (to provide results to various vehicles (e.g., 505, 510, 515) in communication with the cloud-based system 550, or to push to vehicles for use by their in-vehicle systems, among other example implementations. Access points (e.g., 545), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 555) between cloud-based systems (e.g., 550) and various vehicles (e.g., 505, 510, 515). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described herein or illustrated in the FIGS. may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refer to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

Figure 6:
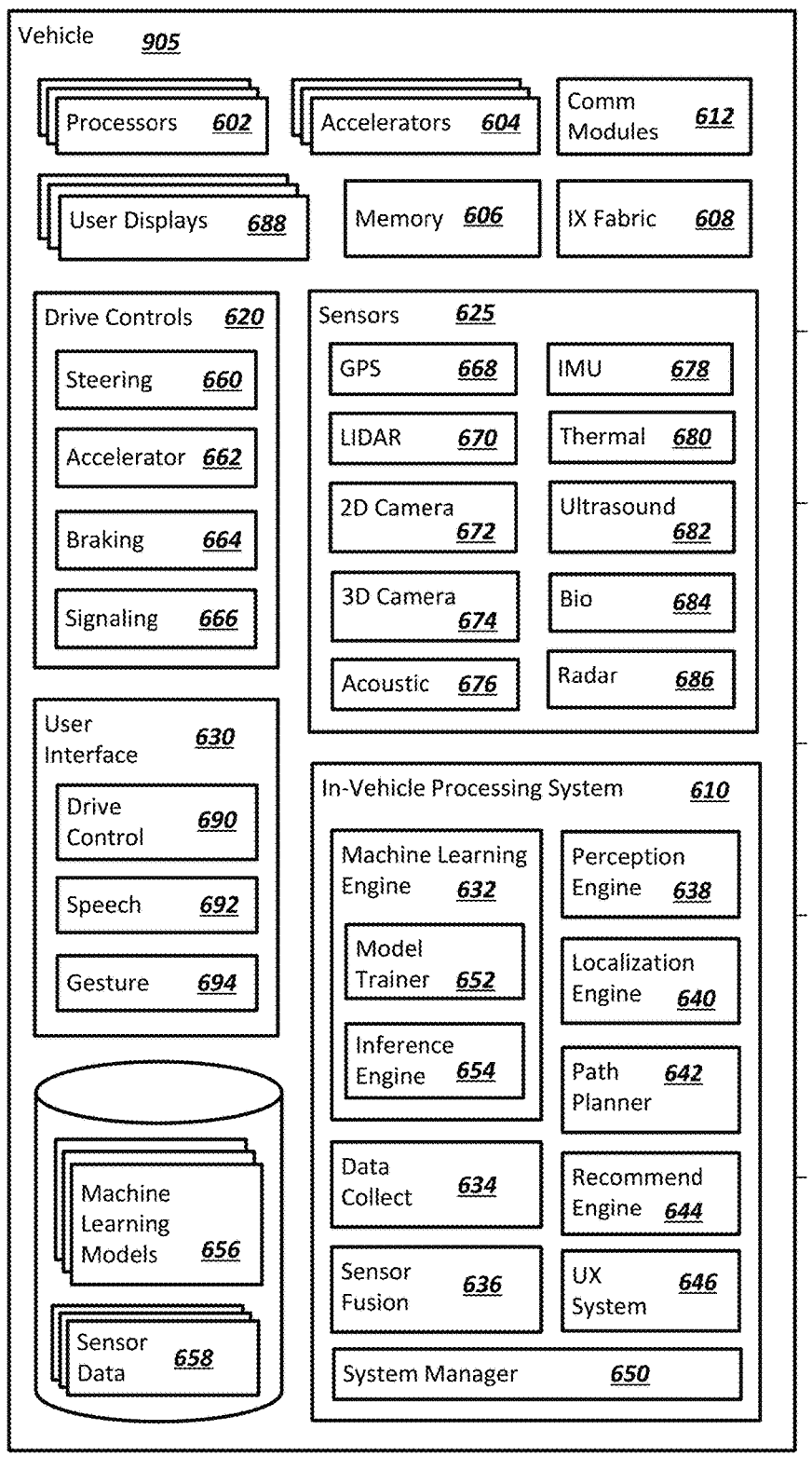
FIG. 6 is a simplified block diagram illustrating an example implementation of a vehicle (and corresponding in-vehicle computing system) equipped with autonomous driving functionality in accordance with certain embodiments.

With reference now to FIG. 6, a simplified block diagram 600 is shown illustrating an example implementation of a vehicle (and corresponding in-vehicle computing system) 505 equipped with autonomous driving functionality. In one example, a vehicle 505 may be equipped with one or more processors 602, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 602 may be coupled to or have integrated hardware accelerator devices (e.g., 604), which may be provided with hardware to accelerate certain processing and memory access functions, such as functions relating to machine learning inference or training, processing of particular sensor data (e.g., camera image data, LIDAR point clouds, etc.), performing certain arithmetic functions pertaining to autonomous driving (e.g., matrix arithmetic, convolutional arithmetic, etc.), among other examples. One or more memory elements (e.g., 606) may be provided to store machine-executable instructions implementing all or a portion of any one of the modules or sub-modules of an autonomous driving stack implemented on the vehicle, as well as storing machine learning models (e.g., 656), sensor data (e.g., 658), and other data received, generated, or used in connection with autonomous driving functionality to be performed by the vehicle (or used in connection with the examples and solutions discussed herein). Various communication modules (e.g., 612) may also be provided, implemented in hardware circuitry and/or software to implement communication capabilities used by the vehicle's system to communicate with other extraneous computing systems over one or more network channels employing one or more network communication technologies. These various processors 602, accelerators 604, memory devices 606, and network communication modules 612, may be interconnected on the vehicle system through one or more interconnect fabrics or links (e.g., 608), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

Continuing with the example of FIG. 6, an example vehicle (and corresponding in-vehicle computing system) 505 may include an in-vehicle processing system 610, driving controls (e.g., 620), sensors (e.g., 625), and user/passenger interface(s) (e.g., 630), among other example modules implemented functionality of the autonomous vehicle in hardware and/or software. For instance, an in-vehicle processing system 610, in some implementations, may implement all or a portion of an autonomous driving stack and process flow (e.g., as shown and discussed in the example of FIG. 5). A machine learning engine 632 may be provided to utilize various machine learning models (e.g., 656) provided at the vehicle 505 in connection with one or more autonomous functions and features provided and implemented at or for the vehicle, such as discussed in the examples herein. Such machine learning models 656 may include artificial neural network models, convolutional neural networks, decision tree-based models, support vector machines (SVMs), Bayesian models, deep learning models, and other example models. In some implementations, an example machine learning engine 632 may include one or more model trainer engines 652 to participate in training (e.g., initial training, continuous training, etc.) of one or more of the machine learning models 656. One or more inference engines 654 may also be provided to utilize the trained machine learning models 656 to derive various inferences, predictions, classifications, and other results.

The machine learning engine(s) 632 provided at the vehicle may be utilized to support and provide results for use by other logical components and modules of the in-vehicle processing system 610 implementing an autonomous driving stack and other autonomous-driving-related features. For instance, a data collection module 634 may be provided with logic to determine sources from which data is to be collected (e.g., for inputs in the training or use of various machine learning models 656 used by the vehicle). For instance, the particular source (e.g., internal sensors (e.g., 625) or extraneous sources (e.g., 515, 540, 550, 580, 615, etc.)) may be selected, as well as the frequency and fidelity at which the data is sampled is selected. In some cases, such selections and configurations may be made at least partially autonomously by the data collection module 634 using one or more corresponding machine learning models (e.g., to collect data as appropriate given a particular detected scenario).

A sensor fusion module 636 may also be used to govern the use and processing of the various sensor inputs utilized by the machine learning engine 632 and other modules (e.g., 638, 640, 642, 644, 646, etc.) of the in-vehicle processing system. One or more sensor fusion modules (e.g., 636) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 636 may apply direct fusion, indirect fusion, among other example sensor fusion techniques. The output of the sensor fusion may, in some cases by fed as an input (along with potentially additional inputs) to another module of the in-vehicle processing system and/or one or more machine learning models in connection with providing autonomous driving functionality or other functionality, such as described in the example solutions discussed herein.

A perception engine 638 may be provided in some examples, which may take as inputs various sensor data (e.g., 658) including data, in some instances, from extraneous sources and/or sensor fusion module 636 to perform object recognition and/or tracking of detected objects, among other example functions corresponding to autonomous perception of the environment encountered (or to be encountered) by the vehicle 505. Perception engine 638 may perform object recognition from sensor data inputs using deep learning, such as through one or more convolutional neural networks and other machine learning models 656. Object tracking may also be performed to autonomously estimate, from sensor data inputs, whether an object is moving and, if so, along what trajectory. For instance, after a given object is recognized, a perception engine 638 may detect how the given object moves in relation to the vehicle. Such functionality may be used, for instance, to detect objects, such as other vehicles, pedestrians, wildlife, cyclists, etc. moving within an environment, which may affect the path of the vehicle on a roadway, among other example uses.

A localization engine 640 may also be included within an in-vehicle processing system 610 in some implementation. In some cases, localization engine 640 may be implemented as a sub-component of a perception engine 638. The localization engine 640 may also make use of one or more machine learning models 656 and sensor fusion (e.g., of LIDAR and GPS data, etc.) to determine a high confidence location of the vehicle and the space it occupies within a given physical space (or "environment").

A vehicle 505 may further include a path planner 642, which may make use of the results of various other modules, such as data collection (e.g., 634), sensor fusion (e.g., 636), perception engine (e.g., 638,) and localization engine (e.g., 640) among others (e.g., recommendation engine 644) to determine a path plan and/or action plan for the vehicle, which may be used by drive controls (e.g., 620) to control the driving of the vehicle 505 within an environment. For instance, a path planner 642 may utilize these inputs and one or more machine learning models to determine probabilities of various events within a driving environment to determine effective real-time plans to act within the environment.

In some implementations, the vehicle 505 may include one or more recommendation engines 644 to generate various recommendations from sensor data generated by the vehicle's 505 own sensors (e.g., 625) as well as sensor data from extraneous sensors (e.g., sensor devices 515, 580, 615, etc.). Some recommendations may be determined by the recommendation engine 644, which may be provided as inputs to other components of the vehicle's autonomous driving stack to influence determinations that are made by these components. For instance, a recommendation may be determined, which, when considered by a path planner 642, causes the path planner 642 to deviate from decisions or plans it would ordinarily otherwise determine, but for the recommendation. Recommendations may also be generated by recommendation engines (e.g., 644) based on considerations of passenger comfort and experience. In some cases, interior features within the vehicle may be manipulated predictively and autonomously based on these recommendations (which are determined from sensor data (e.g., 658) captured by the vehicle's sensors and/or extraneous sensors, etc.

As introduced above, some vehicle implementations may include user/passenger experience engines (e.g., 646), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 658). In some instances, aspects of user interfaces (e.g., 630) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 505) among other example uses.

In some cases, a system manager 650 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 612), vehicle system checks (e.g., issues relating to the motor, transmission, battery, cooling system, electrical system, tires, etc.), or other operational events may be detected by the system manager 650. Such issues may be identified in system report data generated by the system manager 650, which may be utilized, in some cases, as inputs to machine learning models 656 and related autonomous driving modules (e.g., 632, 634, 636, 638, 640, 642, 644, 646, etc.) to enable vehicle system health and issues to also be considered along with other information collected in sensor data 658 in the autonomous driving functionality of the vehicle 505.

In some implementations, an autonomous driving stack of a vehicle 505 may be coupled with drive controls 620 to affect how the vehicle is driven, including steering controls (e.g., 660), accelerator/throttle controls (e.g., 662), braking controls (e.g., 664), signaling controls (e.g., 666), among other examples. In some cases, a vehicle may also be controlled wholly or partially based on user inputs. For instance, user interfaces (e.g., 630), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 692, gesture detection cameras 694, and other examples. User interfaces (e.g., 630) may capture the desires and intentions of the passenger-users and the autonomous driving stack of the vehicle 505 may consider these as additional inputs in controlling the driving of the vehicle (e.g., drive controls 620). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 658) generated by various sensors provided on and external to the vehicle. As an example, a vehicle 505 may possess an array of sensors 625 to collect various information relating to the exterior of the vehicle and the surrounding environment, vehicle system status, conditions within the vehicle, and other information usable by the modules of the vehicle's processing system 610. For instance, such sensors 625 may include global positioning (GPS) sensors 668, light detection and ranging (LIDAR) sensors 670, two-dimensional (2D) cameras 672, three-dimensional (3D) or stereo cameras 674, acoustic sensors 676, inertial measurement unit (IMU) sensors 678, thermal sensors 680, ultrasound sensors 682, bio sensors 684 (e.g., facial recognition, voice recognition, heart rate sensors, body temperature sensors, emotion detection sensors, etc.), radar sensors 686, weather sensors (not shown), among other example sensors. Sensor data 658 may also (or instead) be generated by sensors that are not integrally coupled to the vehicle, including sensors on other vehicles (e.g., 515) (which may be communicated to the vehicle 505 through vehicle-to-vehicle communications or other techniques), sensors on ground-based or aerial drones 580, sensors of user devices 615 (e.g., a smartphone or wearable) carried by human users inside or outside the vehicle 505, and sensors mounted or provided with other roadside elements, such as a roadside unit (e.g., 540), road sign, traffic light, streetlight, etc. Sensor data from such extraneous sensor devices may be provided directly from the sensor devices to the vehicle or may be provided through data aggregation devices or as results generated based on these sensors by other computing systems (e.g., 540, 550), among other example implementations.

In some implementations, an autonomous vehicle 505 may interface with and leverage information and services provided by other computing systems to enhance, enable, or otherwise support the autonomous driving functionality of the vehicle 505. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 540), other (e.g., higher-level) vehicles (e.g., 515), and cloud-based systems 550 (e.g., accessible through various network access points (e.g., 545)). A roadside unit 540 or cloud-based system 550 (or other cooperating system, with which a vehicle (e.g., 505) interacts may include all or a portion of the logic illustrated as belonging to an example in-vehicle processing system (e.g., 610), along with potentially additional functionality and logic. For instance, a cloud-based computing system, roadside unit 540, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's processing system 610. For instance, an in-vehicle processing system 610 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 505 may, in some implementations, be alternatively or redundantly provided within a cloud-based, fog-based, or other computing system supporting an autonomous driving environment.

Various embodiments herein may utilize one or more machine learning models to perform functions of the AV stack (or other functions described herein). A machine learning model may be executed by a computing system to progressively improve performance of a specific task. In some embodiments, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various embodiments described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various embodiments described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

Figure 7:
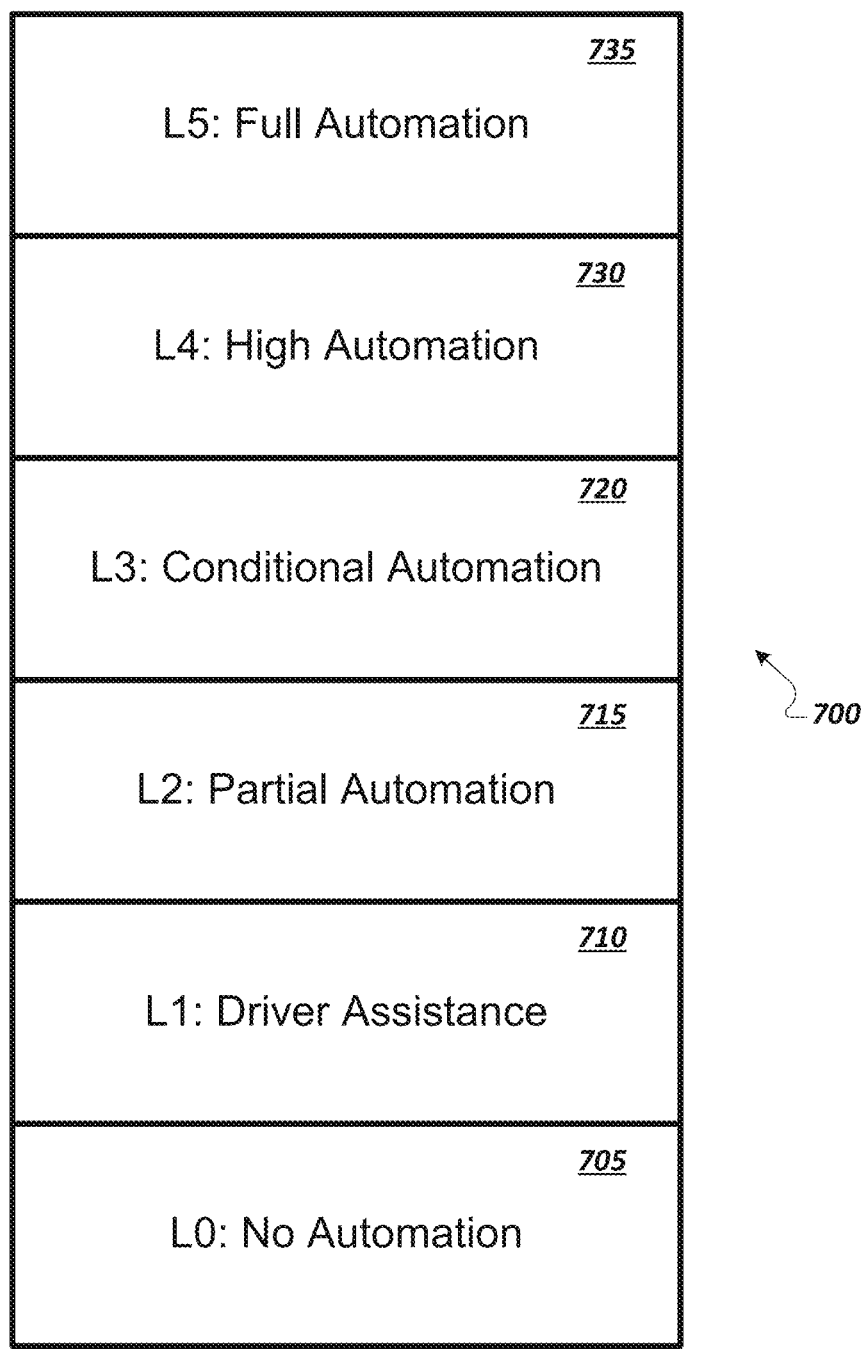
FIG. 7 is a simplified block diagram illustrating example levels of autonomous driving which may be supported in various vehicles (e.g., by their corresponding in-vehicle computing systems) in accordance with certain embodiments.

Turning to FIG. 7, a simplified block diagram 700 is shown illustrating example levels of autonomous driving, which may be supported in various vehicles (e.g., by their corresponding in-vehicle computing systems). For instance, a range of levels may be defined (e.g., L0-L5 (705-735)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 735) may possess a fully-autonomous computing system capable of providing autonomous driving performance in every driving scenario equal to or better than would be provided by a human driver, including in extreme road conditions and weather. An L4 vehicle (e.g., 730) may also be considered fully-autonomous capable of performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 720) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 715) provide driver assistance functionality, which allow the driver to occasionally disengage from physically operating the vehicle, such that both the hands and feet of the driver may disengage periodically from the physical controls of the vehicle. L1 vehicles (e.g., 710) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 8:
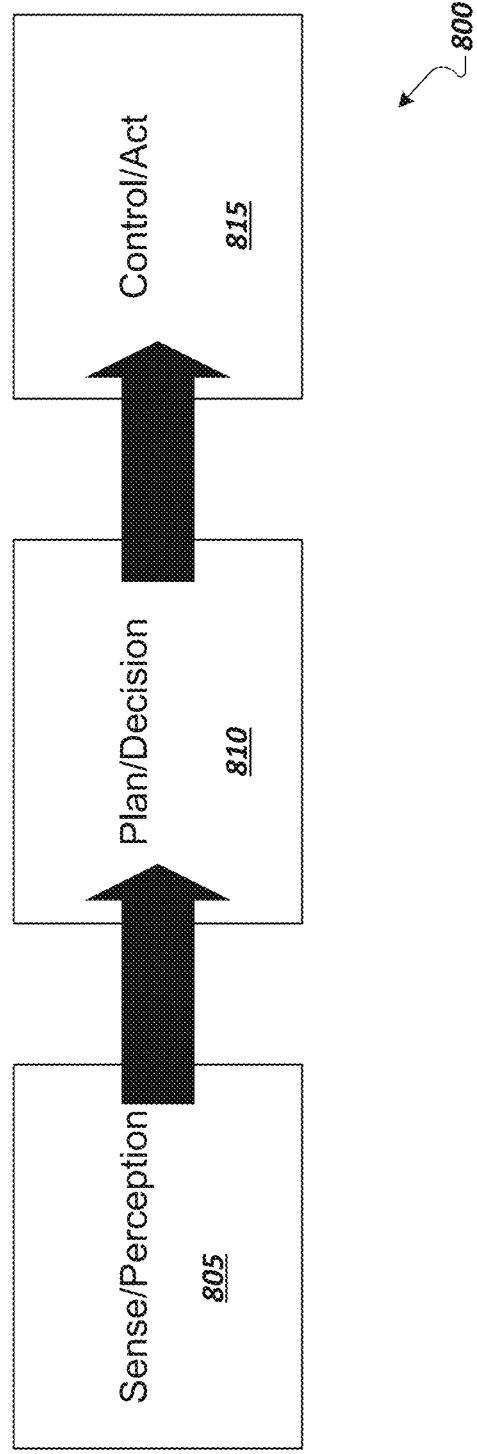
FIG. 8 is a simplified block diagram illustrating an example autonomous driving flow which may be implemented in some autonomous driving systems in accordance with certain embodiments.

FIG. 8 is a simplified block diagram 800 illustrating an example autonomous driving flow which may be implemented in some autonomous driving systems. For instance, an autonomous driving flow implemented in an autonomous (or semi-autonomous) vehicle may include a sensing and perception stage 805, a planning and decision stage 810, and a control and action phase 815. During a sensing and perception stage 805 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 810 may utilize the sensor data and results of various perception operations to make probabilistic predictions of the roadway(s) ahead and determine a real time path plan based on these predictions. A planning and decision stage 810 may additionally include making decisions relating to the path plan in reaction to the detection of obstacles and other events to decide on whether and what action to take to safely navigate the determined path in light of these events. Based on the path plan and decisions of the planning and decision stage 810, a control and action stage 815 may convert these determinations into actions, through actuators to manipulate driving controls including steering, acceleration, and braking, as well as secondary controls, such as turn signals, sensor cleaners, windshield wipers, headlights, etc.

Figure 9:
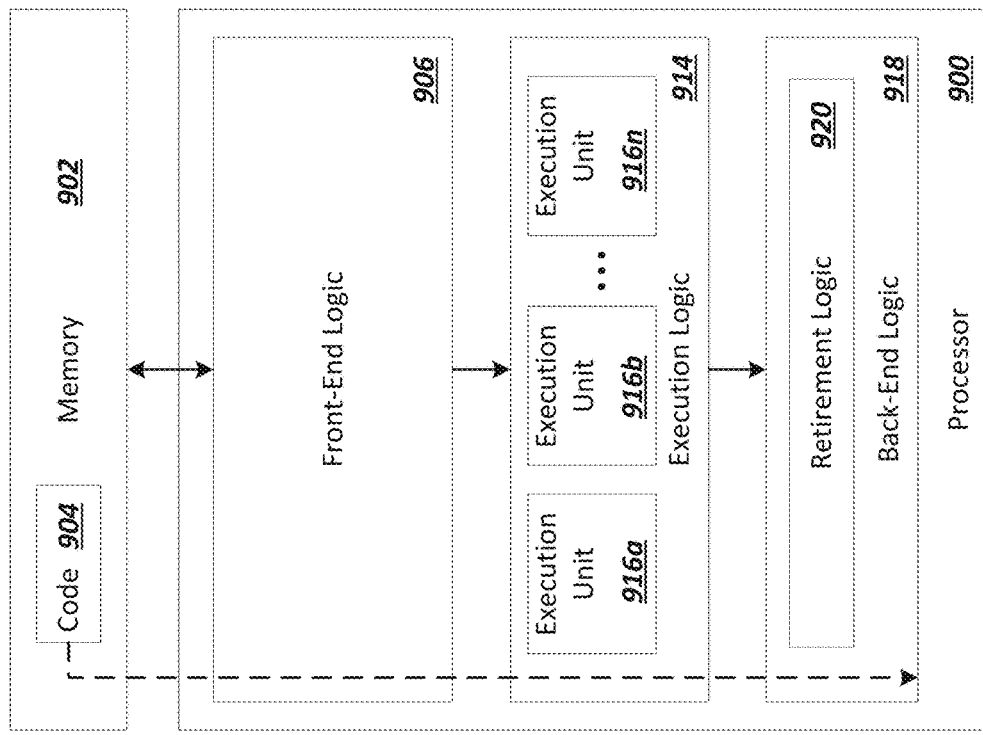
FIG. 9 is an example illustration of a processor in accordance with certain embodiments.
Figure 10:
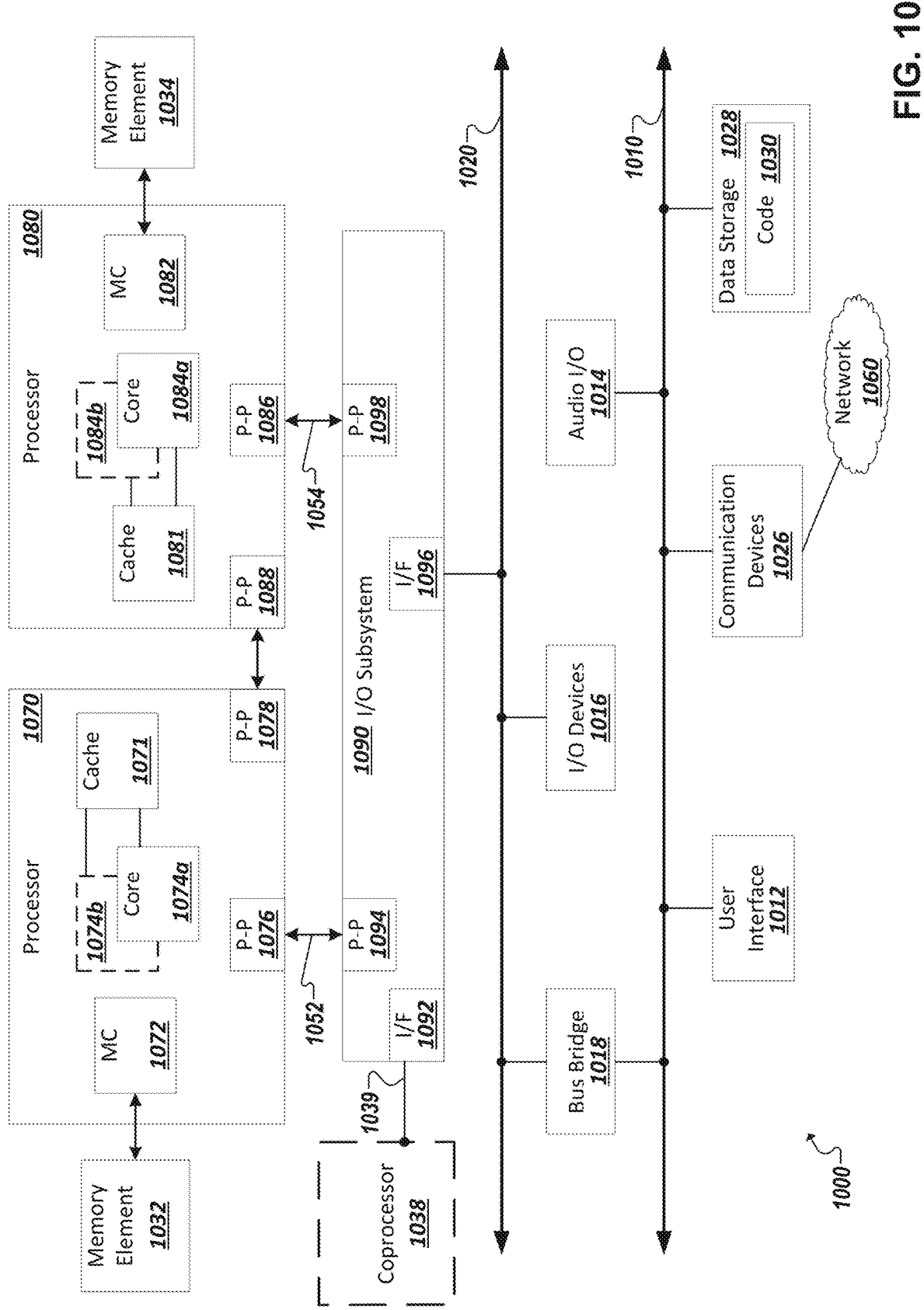
FIG. 10 illustrates a computing system that is arranged in a point-to-point (PtP) configuration in accordance with certain embodiments.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with processes, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 900.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

The following examples pertain to embodiments in accordance with this Specification. Example 1 is an apparatus comprising an antenna array comprising a plurality of antennas to receive a plurality of radar signals reflected by a plurality of objects responsive to a transmitted radar signal; a doppler measurement module to determine, for a first reflected radar signal of the plurality of reflected radar signals, a first doppler measurement indicating a velocity component based on a comparison of the first reflected radar signal to the transmitted radar signal; a phase offset measurement module to determine a first phase offset of the first reflected radar signal received at a first antenna of the plurality of antennas relative to a phase of the first reflected radar signal received at a reference antenna of the plurality of antennas; and a phase offset calibration module to determine, for the first antenna, a first phase offset calibration error based on the first doppler measurement and the first phase offset.

Example 2 may include the subject matter of example 1, wherein the phase offset calibration module is to determine, for each object of the plurality of objects, a phase offset calibration error based on a doppler measurement and a phase offset measurement associated with the respective object.

Example 3 may include the subject matter of example 2, wherein the first phase offset calibration error for the first antenna is a mean of the phase offset calibration errors determined for each object of the plurality of objects.

Example 4 may include the subject matter of example 2, wherein the first phase offset calibration error for the first antenna is a trimmed mean of the phase offset calibration errors determined for each object of the plurality of objects.

Example 5 may include the subject matter of example 2, wherein the first phase offset calibration error for the first antenna is a median of the phase offset calibration errors determined for each object of the plurality of objects.

Example 6 may include the subject matter of example 2, wherein the plurality of objects includes stationary objects and moving objects.

Example 7 may include the subject matter of any of examples 1-6, wherein the phase offset measurement module is to determine a second phase offset of the first reflected radar signal received at a second antenna of the plurality of antennas relative to the phase of the first reflected radar signal received at the reference antenna of the plurality of antennas; and the phase offset calibration module is to determine, for the second antenna, a second phase offset calibration error based on the first doppler measurement and the second phase offset.

Example 8 may include the subject matter of any of examples 1-7, further comprising an angle determination module to calculate an angle indicating a position of a first object that reflected the first reflected radar signal, the angle calculation based in part on a corrected phase offset calculated by subtracting the first phase offset calibration error from the first phase offset.

Example 9 may include the subject matter of any of examples 1-8, wherein the first phase offset calibration error is further based on a speed of a vehicle comprising the antenna array.

Example 10 may include the subject matter of any of example 1-9, wherein the first phase offset calibration error is further based on a distance between the first antenna and the reference antenna.

Example 11 is a method comprising receiving, by a plurality of antennas, a plurality of radar signals reflected by a plurality of objects responsive to a transmitted radar signal; determining, for a first reflected radar signal of the plurality of reflected radar signals, a first doppler measurement indicating a velocity component based on a comparison of the first reflected radar signal to the transmitted radar signal; determining a first phase offset of the first reflected radar signal received at a first antenna of the plurality of antennas relative to a phase of the first reflected radar signal received at a reference antenna of the plurality of antennas; and determining, for the first antenna, a first phase offset calibration error based on the first doppler measurement and the first phase offset.

Example 12 may include the subject matter of example 11, further comprising determining, for each object of the plurality of objects, a phase offset calibration error based on a doppler measurement and a phase offset measurement associated with the respective object.

Example 13 may include the subject matter of example 12, wherein the first phase offset calibration error for the first antenna is a mean of the phase offset calibration errors determined for each object of the plurality of objects.

Example 14 may include the subject matter of example 12, wherein the first phase offset calibration error for the first antenna is a trimmed mean of the phase offset calibration errors determined for each object of the plurality of objects.

Example 15 may include the subject matter of example 12, wherein the first phase offset calibration error for the first antenna is a median of the phase offset calibration errors determined for each object of the plurality of objects.

Example 16 may include the subject matter of example 12, wherein the plurality of objects includes stationary objects and moving objects.

Example 17 may include the subject matter of any of examples 11-16, determining a second phase offset of the first reflected radar signal received at a second antenna of the plurality of antennas relative to the phase of the first reflected radar signal received at the reference antenna of the plurality of antennas; and determining, for the second antenna, a second phase offset calibration error based on the first doppler measurement and the second phase offset.

Example 18 may include the subject matter of any of examples 11-17, further comprising calculating an angle indicating a position of a first object that reflected the first reflected radar signal, the angle calculation based in part on a corrected phase offset calculated by subtracting the first phase offset calibration error from the first phase offset.

Example 19 may include the subject matter of any of examples 11-18, further comprising calculating a speed of a vehicle comprising the plurality of antennas and determining the first phase offset calibration error based on the speed of the vehicle.

Example 20 may include the subject matter of any of example 11-19, wherein the first phase offset calibration error is further based on a distance between the first antenna and the reference antenna.

Example 21 is a vehicle comprising a processor; drive controls comprising an accelerator and a steering system; and a radar system to receive, by a plurality of antennas, a plurality of radar signals reflected by a plurality of objects responsive to a transmitted radar signal; determine, for a first reflected radar signal of the plurality of reflected radar signals, a first doppler measurement indicating a velocity component based on a comparison of the first reflected radar signal to the transmitted radar signal; determine a first phase offset of the first reflected radar signal received at a first antenna of the plurality of antennas relative to a phase of the first reflected radar signal received at a reference antenna of the plurality of antennas; and determine, for the first antenna, a first phase offset calibration error based on the first doppler measurement and the first phase offset.

Example 22 may include the subject matter of example 21, the radar system to determine, for each object of the plurality of objects, a phase offset calibration error based on a doppler measurement and a phase offset measurement associated with the respective object.

Example 23 may include the subject matter of example 22, wherein the first phase offset calibration error for the first antenna is a mean of the phase offset calibration errors determined for each object of the plurality of objects.

Example 24 may include the subject matter of example 22, wherein the first phase offset calibration error for the first antenna is a trimmed mean of the phase offset calibration errors determined for each object of the plurality of objects.

Example 25 may include the subject matter of example 22, wherein the first phase offset calibration error for the first antenna is a median of the phase offset calibration errors determined for each object of the plurality of objects.

Example 26 may include the subject matter of example 22, wherein the plurality of objects includes stationary objects and moving objects.

Example 27 may include the subject matter of any of examples 21-26, the radar system to determine a second phase offset of the first reflected radar signal received at a second antenna of the plurality of antennas relative to the phase of the first reflected radar signal received at the reference antenna of the plurality of antennas; and determine, for the second antenna, a second phase offset calibration error based on the first doppler measurement and the second phase offset.

Example 28 may include the subject matter of any of examples 21-27, the radar system to calculate an angle indicating a position of a first object that reflected the first reflected radar signal, the angle calculation based in part on a corrected phase offset calculated by subtracting the first phase offset calibration error from the first phase offset.

Example 29 may include the subject matter of any of examples 21-28, wherein the radar system is to determine the first phase offset calibration error based on a speed of the vehicle.

Example 30 may include the subject matter of any of example 21-29, wherein the first phase offset calibration error is further based on a distance between the first antenna and the reference antenna.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to some embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An apparatus comprising:
    an antenna array comprising a plurality of antennas to receive a plurality of reflected radar signals reflected by a plurality of objects responsive to a transmitted radar signal, wherein the plurality of reflected radar signals includes a first reflected radar signal reflected by a first object, a second reflected radar signal reflected by a second object, and a third reflected radar signal reflected by a third object;
    a doppler measurement module to:
        determine, for the first reflected radar signal, a first doppler measurement indicating a velocity component based on a comparison of the first reflected radar signal to the transmitted radar signal;
        determine, for the second reflected radar signal, a second doppler measurement indicating a second velocity component based on a comparison of the second reflected radar signal to the transmitted radar signal; and
        determine, for the third reflected radar signal, a third doppler measurement indicating a third velocity component based on a comparison of the third reflected radar signal to the transmitted radar signal;
    a phase offset measurement module to:
        determine a first phase offset of the first reflected radar signal received at a first antenna of the plurality of antennas relative to a phase of the first reflected radar signal received at a reference antenna of the plurality of antennas;
        determine a second phase offset of the second reflected radar signal received at the first antenna relative to a phase of the second reflected radar signal received at the reference antenna; and
        determine a third phase offset of the third reflected radar signal received at the first antenna relative to a phase of the third reflected radar signal received at the reference antenna; and
    a phase offset calibration module to determine, for the first antenna, a phase offset calibration error based on:
        a first phase offset calibration error for the first object based on the first doppler measurement and the first phase offset;
        a second phase offset calibration error for the second object based on the second doppler measurement and the second phase offset; and a third phase offset calibration error for the third object based on the third doppler measurement and the third phase offset.

2. The apparatus of claim 1, wherein the phase offset calibration module is to determine, for each object of the plurality of objects, a phase offset calibration error specific to the respective object based on a doppler measurement and a phase offset measurement determined from a reflected radar signal from the respective object.

3. The apparatus of claim 2, wherein the phase offset calibration error for the first antenna is a mean of the phase offset calibration errors determined for each object of the plurality of objects.

4. The apparatus of claim 2, wherein the phase offset calibration error for the first antenna is a trimmed mean of the phase offset calibration errors determined for each object of the plurality of objects.

5. The apparatus of claim 2, wherein the phase offset calibration error for the first antenna is a median of the phase offset calibration errors determined for each object of the plurality of objects.

6. The apparatus of claim 2, wherein the plurality of objects includes stationary objects and moving objects.

7. The apparatus of claim 1, wherein:
the phase offset measurement module is to determine a second phase offset of the first reflected radar signal received at a second antenna of the plurality of antennas relative to the phase of the first reflected radar signal received at the reference antenna of the plurality of antennas; and
the phase offset calibration module is to determine, for the second antenna, a phase offset calibration error based on the first doppler measurement and the second phase offset of the first reflected radar signal received at the second antenna.

8. The apparatus of claim 1, further comprising an angle determination module to calculate an angle indicating a position of the first object that reflected the first reflected radar signal, the angle calculation based in part on a corrected phase offset calculated by subtracting the phase offset calibration error for the first antenna from the first phase offset.

9. The apparatus of claim 1, wherein the phase offset calibration error for the first antenna is further based on a speed of a vehicle comprising the antenna array.

10. The apparatus of claim 1, wherein the phase offset calibration error for the first antenna is further based on a distance between the first antenna and the reference antenna.

11. A method comprising:
receiving, by a plurality of antennas, a plurality of reflected radar signals reflected by a plurality of objects responsive to a transmitted radar signal, wherein the plurality of reflected radar signals includes a first reflected radar signal reflected by a first object, a second reflected radar signal reflected by a second object, and a third reflected radar signal reflected by a third object;
determining, for the first reflected radar signal, a first doppler measurement indicating a velocity component based on a comparison of the first reflected radar signal to the transmitted radar signal;
determining, for the second reflected radar signal, a second doppler measurement indicating a second velocity component based on a comparison of the second reflected radar signal to the transmitted radar signal;
determining, for the third reflected radar signal, a third doppler measurement indicating a third velocity component based on a comparison of the third reflected radar signal to the transmitted radar signal;
determining a first phase offset of the first reflected radar signal received at a first antenna of the plurality of antennas relative to a phase of the first reflected radar signal received at a reference antenna of the plurality of antennas;
determining a second phase offset of the second reflected radar signal received at the first antenna relative to a phase of the second reflected radar signal received at the reference antenna;
determining a third phase offset of the third reflected radar signal received at the first antenna relative to a phase of the third reflected radar signal received at the reference antenna; and
determining, for the first antenna, a phase offset calibration error based on:
a first phase offset calibration error for the first object based on the first doppler measurement and the first phase offset;
a second phase offset calibration error for the second object based on the second doppler measurement and the second phase offset; and
a third phase offset calibration error for the third object based on the third doppler measurement and the third phase offset.

12. The method of claim 11, further comprising determining, for each object of the plurality of objects, a phase offset calibration error specific to the respective object based on a doppler measurement and a phase offset measurement determined from a reflected radar signal from the respective object.

13. The method of claim 11, further comprising:
determining a second phase offset of the first reflected radar signal received at a second antenna of the plurality of antennas relative to the phase of the first reflected radar signal received at the reference antenna of the plurality of antennas; and
determining, for the second antenna, a phase offset calibration error based on the first doppler measurement and the second phase offset of the first reflected radar signal received at the second antenna.

14. The method of claim 11, further comprising calculating an angle indicating a position of the first object that reflected the first reflected radar signal, the angle calculation based in part on a corrected phase offset calculated by subtracting the phase offset calibration error for the first antenna from the first phase offset.

15. The method of claim 11, further comprising calculating a speed of a vehicle comprising the plurality of antennas and determining the phase offset calibration error for the first antenna based on the speed of the vehicle.

16. A vehicle comprising:
a processor;
drive controls comprising an accelerator and a steering system; and
a radar system to:
receive, by a plurality of antennas, a plurality of reflected radar signals reflected by a plurality of objects responsive to a transmitted radar signal, wherein the plurality of reflected radar signals includes a first reflected radar signal reflected by a first object, a second reflected radar signal reflected by a second object, and a third reflected radar signal reflected by a third object;

determine, for the first reflected radar signal, a first doppler measurement indicating a velocity component based on a comparison of the first reflected radar signal to the transmitted radar signal;

determine, for the second reflected radar signal, a second doppler measurement indicating a second velocity component based on a comparison of the second reflected radar signal to the transmitted radar signal;

determine, for the third reflected radar signal, a third doppler measurement indicating a third velocity component based on a comparison of the third reflected radar signal to the transmitted radar signal;

determine a first phase offset of the first reflected radar signal received at a first antenna of the plurality of antennas relative to a phase of the first reflected radar signal received at a reference antenna of the plurality of antennas;

determine a second phase offset of the second reflected radar signal received at the first antenna relative to a phase of the second reflected radar signal received at the reference antenna;

determine a third phase offset of the third reflected radar signal received at the first antenna relative to a phase of the third reflected radar signal received at the reference antenna; and determine, for the first antenna, a phase offset calibration error based on:
- a first phase offset calibration error for the first object based on the first doppler measurement and the first phase offset;
- a second phase offset calibration error for the second object based on the second doppler measurement and the second phase offset; and
- a third phase offset calibration error for the third object based on the third doppler measurement and the third phase offset.

17. The vehicle of claim 16, the radar system to determine, for each object of the plurality of objects, a phase offset calibration error specific to the respective object based on a doppler measurement and a phase offset measurement determined from a reflected radar signal from the respective object.

18. The vehicle of claim 16, the radar system to:
determine a second phase offset of the first reflected radar signal received at a second antenna of the plurality of antennas relative to the phase of the first reflected radar signal received at the reference antenna of the plurality of antennas; and
determine, for the second antenna, a phase offset calibration error based on the first doppler measurement and the second phase offset of the first reflected radar signal received at the second antenna.

19. The vehicle of claim 16, the radar system to calculate an angle indicating a position of the first object that reflected the first reflected radar signal, the angle calculation based in part on a corrected phase offset calculated by subtracting the phase offset calibration error for the first antenna from the first phase offset.

20. The vehicle of claim 16, wherein the radar system is to determine the phase offset calibration error for the first antenna based on a speed of the vehicle.

* * * * *